United States Patent
Nishimoto

(10) Patent No.: US 8,354,616 B2
(45) Date of Patent: Jan. 15, 2013

(54) HEATER APPARATUS, SYSTEM, AND METHOD FOR STABILIZING A SHEET MATERIAL

(75) Inventor: Michael Yoshiya Nishimoto, Painted Post, NY (US)

(73) Assignee: Corning Incorporated, Corning, NY (US)

(*) Notice: Subject to any disclaimer, the term of this patent is extended or adjusted under 35 U.S.C. 154(b) by 1229 days.

(21) Appl. No.: 12/080,041

(22) Filed: Mar. 31, 2008

(65) Prior Publication Data

US 2009/0242537 A1    Oct. 1, 2009

(51) Int. Cl.
     *H05B 1/00*    (2006.01)

(52) U.S. Cl. ....................................... 219/201

(58) Field of Classification Search .............. 219/201, 219/385, 388; 310/26, 323.19, 328, 343, 310/311; 242/548.4, 548, 556, 615.11, 615.12; 198/773; 34/90, 191, 192; 73/570.5; 181/0.5; 318/118; 392/407, 417, 418, 432, 433, 435; 226/97.1–97.3; 269/329
See application file for complete search history.

(56) References Cited

U.S. PATENT DOCUMENTS

| | | | |
|---|---|---|---|
| 3,338,696 A | 8/1967 | Dockerty | |
| 3,682,609 A | 8/1972 | Dockerty | |
| 4,740,342 A * | 4/1988 | Menard et al. | 264/549 |
| 5,036,944 A * | 8/1991 | Danley et al. | 181/0.5 |
| 5,337,393 A * | 8/1994 | Reunamaki | 392/417 |
| 5,411,128 A | 5/1995 | Vild et al. | 198/345.1 |
| 5,810,155 A * | 9/1998 | Hashimoto et al. | 198/630 |
| 6,130,408 A * | 10/2000 | Fukuda et al. | 219/216 |
| 6,802,220 B2 | 10/2004 | Takasan et al. | 73/570.5 |
| 6,994,207 B2 * | 2/2006 | Takasan et al. | 198/752.1 |
| 7,149,151 B2 * | 12/2006 | Byzio et al. | 367/152 |
| 2004/0013449 A1 | 1/2004 | Fujimoto et al. | 399/261 |
| 2007/0126834 A1 | 6/2007 | Deily et al. | 347/102 |

FOREIGN PATENT DOCUMENTS

| | | | |
|---|---|---|---|
| EP | 0 064 593 | * | 11/1982 |
| JP | 59114994 | * | 7/1984 |
| JP | 06-301302 | | 11/1994 |
| WO | WO0162680 | | 8/2001 |

* cited by examiner

*Primary Examiner* — Duc Nguyen
*Assistant Examiner* — Mark Woodall
(74) *Attorney, Agent, or Firm* — Thomas R. Beall; Siwen Chen

(57) ABSTRACT

An apparatus for stabilizing a sheet material by near-field levitation comprises a heater plate including a heating element and a radiation surface which vibrates when the heater plate receives an acoustic wave. The apparatus further comprises at least one vibration source coupled to the heater plate and operable to transmit the acoustic wave to the heater plate.

14 Claims, 11 Drawing Sheets ered by reference, are used to form sheet materials with
HEATER APPARATUS, SYSTEM, AND METHOD FOR STABILIZING A SHEET MATERIAL

FIELD

The invention relates to the field of heating and stabilizing a sheet material having an unconstrained portion.

BACKGROUND

Fusion draw processes such as described in U.S. Pat. Nos. 3,338,696 and 3,682,609, issued to Dockerty, herein incorporated by reference, are used to form sheet materials with pristine surfaces of fire-polished quality. A typical fusion draw process involves delivering molten material into a contoured channel of a weir device. The molten material wells over the weir device, divides, and flows down the sides of the weir device. At the bottom of the weir device, the divided flow converges to form a single sheet with pristine surfaces of fire-polished quality. The single sheet is translated through a series of heated zones and drawn into a final desired thickness.

Fusion draw processes can deliver sheet materials that do not require post-forming finishing operations such as lapping and polishing for advanced applications such as flat panel displays. However, it can be difficult to control stress level and variation within the sheet while drawing the sheet, and high stress level and variation within the drawn sheet may result in permanent distortion in the final product. One factor that contributes to stress and stress variation within the sheet is sheet motion. Typically, the sheet is only physically constrained at or near the edges while in the draw in order to maximize the quality area of the sheet. As a result, the bulk of the sheet is free to move while the sheet is being drawn. Such sheet motion has been found to negatively impact the level of stress and stress variation within the sheet. Processes performed at the bottom of the draw that involve applying forces to the sheet, such as sheet separation processes, can also exacerbate sheet motion. Other factors that contribute to high stress level and stress variation within the sheet include coarse temperature control in the annealing zone of the fusion draw machine, or inadequate inline annealing, and uncontrolled air currents from chimney effect within the fusion draw machine.

SUMMARY

In one aspect, the invention relates to a heater apparatus for stabilizing a sheet material which comprises a heater plate including a heating element and a radiation surface which vibrates when the heater plate receives an acoustic wave. The heater apparatus further includes at least one vibration source coupled to the heater plate and operable to transmit the acoustic wave to the heater plate.

In another aspect, a system for stabilizing a sheet material comprises a pair of side walls defining a channel for receiving the sheet material, a plurality of heater plates arranged on opposite sides of the channel. Each of the heater plates includes a heating element and a radiation surface which vibrates when the heater plate receives an acoustic wave. The system further includes a plurality of vibration sources coupled to the plurality of heater plates and operable to transmit acoustic waves to the heater plates.

In yet another aspect, the invention relates to a method of stabilizing a sheet material comprising receiving an unconstrained portion of the sheet material between a plurality of heater plates arranged on opposite sides of a channel, each of the heater plates including a heating element and having a radiation surface which vibrates when the heater plate receives an acoustic wave. The method further includes transmitting acoustic waves to the heater plates and creating standing waves between the radiation surfaces and unconstrained portion which levitate the unconstrained portion and maintain the unconstrained portion in a selected plane.

Other features and advantages of the invention will be apparent from the following description and the appended claims.

BRIEF DESCRIPTION OF DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain views of the figures may be shown exaggerated in scale or in schematic in the interest of clarity and conciseness.

DETAILED DESCRIPTION

Figure 1A:
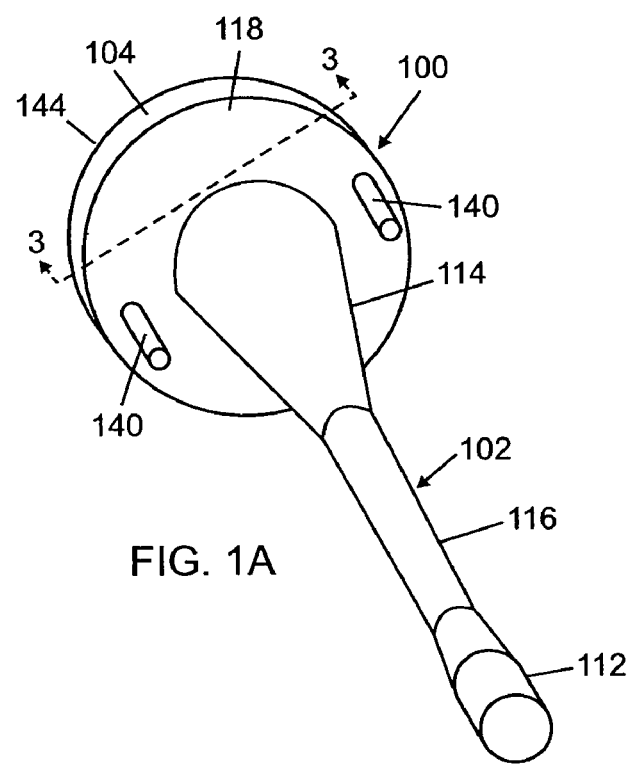
FIG. 1A is a perspective view of a heater apparatus for stabilizing a sheet material, the heater apparatus having a single vibration source.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Figure 2A:
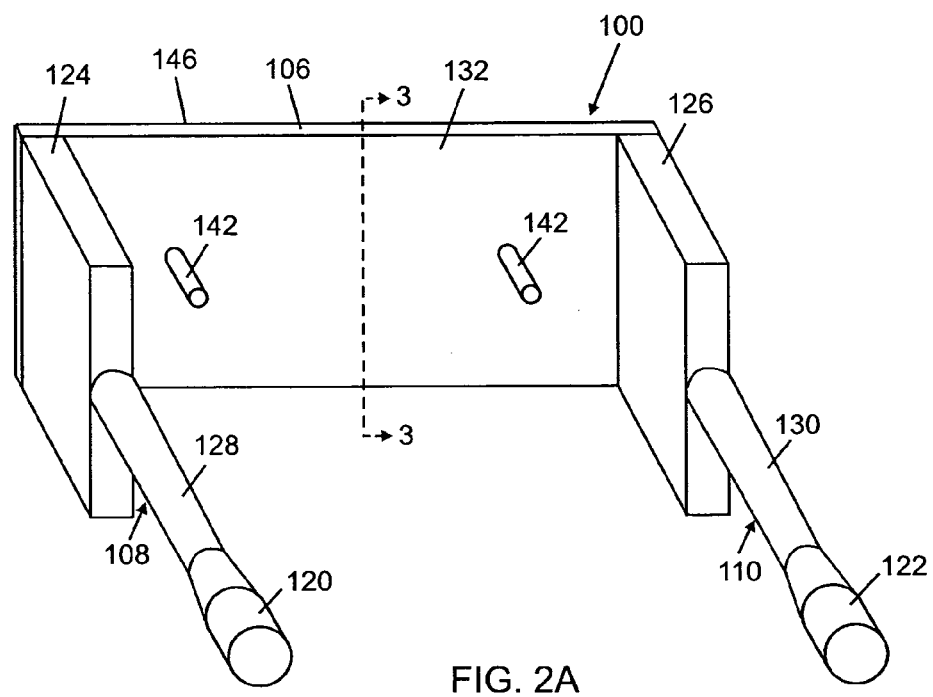
FIG. 2A is a perspective view of a heater apparatus for stabilizing a sheet material, the heater apparatus having multiple vibration sources.

FIGS. 1A and 2A illustrate different implementations of a heater apparatus 100 for stabilizing a sheet material. Heater apparatus 100 stabilizes the sheet material by controlling motion of an unconstrained portion of the sheet material without making physical contact with the unconstrained portion of the sheet material. A plurality of the heater apparatus 100 are arranged on opposite sides of an unconstrained portion of the sheet material and operated to generate a near-field levitation which maintains the unconstrained portion in a selected plane, which may be vertical, horizontal, inclined, or curvilinear. While levitating the unconstrained portion, the heater apparatus 100 can also apply heat to the unconstrained portion. The heat can be applied locally and within a few hundred micrometers of the sheet material, thereby enabling fine temperature control over the sheet material.

Figure 1B:
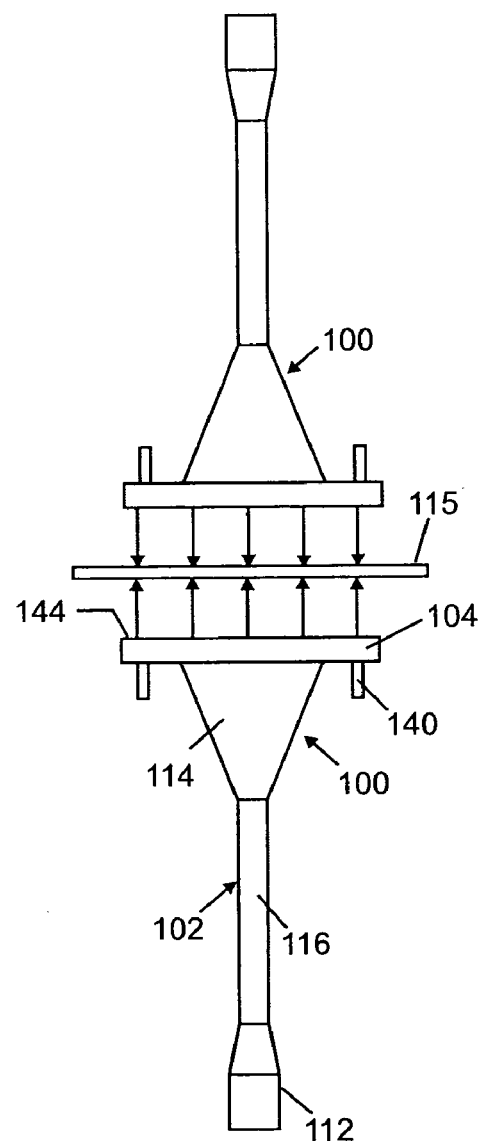
FIG. 1B depicts an object suspended between a pair of the heater apparatus of FIG. 1A.

Referring now to FIG. 1A, apparatus 100 includes a longitudinal vibration source 102 coupled to a back surface 118 of a heater plate 104. The vibration source 102 includes a transducer 112, which may include any suitable transducer element(s), such as a piezoelectric, magnetostrictive or super-magnetostrictive element. The vibration source 112 further includes a horn 114 which is coupled to the transducer 112 by a sound propagation tube 116. The sound propagation axis of the vibration source 102 is substantially perpendicular to the heater plate 104 (or the back surface 118 of the heater plate 104). The transducer 112, when energized, generates an acoustic wave that is transmitted to the heater plate 104 through the sound propagation tube 116 and the horn 114. The acoustic wave could be ultrasonic. The horn 114 increases the amplitude of the acoustic wave and spreads the acoustic wave over the heater plate 104. In this example, the horn 114 has a truncated cone shape and creates a circular spread of the acoustic wave. The heater plate 104 has a disc shape to make efficient use of the circular spread of the acoustic wave provided by horn 114. In general, the shapes of the horn 114 and heater plate 104 are selected to achieve an even spread of the acoustic wave over the heater plate 104. The heater plate 104 has a radiation surface 144 which vibrates when the acoustic wave spreads over the heater plate 104. In one example, the radiation surface 144 is planar. In alternate examples, the acoustic wave radiation surface 144 may have a different shape, such as a curvilinear shape, to better conform to the shape of an object to be levitated. As shown in FIG. 1B, when an object 115, such as an unconstrained portion of a sheet material, is positioned in opposing relation to and within a near-field region of the vibrating radiation surface 144, a standing wave is formed between the vibrating radiation surface 144 and the object 115 which levitates the object 115. The levitation distance can be several tens to hundreds of micrometers. The near-field region is typically within a few hundred microns of the radiation surface 144, for example, within 750 μm measured from the radiation surface 144. When the object 115 is disposed between a pair of opposing heater apparatus 100, levitation force is applied on both sides of the object 115 in opposing relation to the heater apparatus 100. The levitation force if balanced can maintain the object 115 in a desired plane and prevent or minimize distortion of the object 115.

In general, heater apparatus 100 may have one or more longitudinal vibration sources coupled to a back surface of a heater plate. In FIG. 2A, heater apparatus 100 includes longitudinal vibration sources 108, 110 coupled to a back surface 132 of a heater plate 106. The vibration sources 108, 110 include transducers 120, 122, respectively, each of which may include any suitable transducer element(s), such as a piezoelectric, magnetostrictive or super-magnetostrictive element. Vibration sources 108, 110 further include horns 124, 126 coupled to the transducers 120, 122 by sound propagation tubes 128, 130, respectively. The sound propagation axes of the vibration sources 108, 110 are perpendicular or substantially perpendicular to the heater plate 106 (or the back surface 132 of the heater plate 106).

In one example, transducers 120, 122 function as acoustic wave transmitters. When energized, transducers 120, 122 transmit acoustic waves to the heater plate 106 through the sound propagation tubes 128, 130 and horns 124, 126, respectively. The acoustic waves may be ultrasonic. The horns 124, 126 have a parallelepiped shape which provide rectangular or elliptical spread of acoustic energy radiation over the heater plate 106. Heater plate 106 may have a rectangular shape as shown or other elongated shape. The heater plate 106 has a radiation surface 146 which vibrates when the acoustic wave spreads over the heater plate 106. As shown in FIG. 2A, when the object 115 is positioned in opposing relation to and within a near-field region of the vibrating radiation surface 146, a standing wave is formed between the vibrating radiation surface 146 and the object which levitates the object. The near-field region is typically within a few hundred microns of the radiation surface 146, for example, within 750 μm, preferably within 600 μm, measured from the radiation surface 146. In one example, the radiation surface 146 has a planar surface. In alternate examples, the acoustic wave radiation surface 146 may have a different shape, such as a curvilinear shape, to better conform to the shape of the object to be levitated.

In another example, transducer 120 functions as an acoustic wave transmitter while transducer 122 functions as an acoustic wave receiver. Transducer 120 functions as described above to vibrate the radiation surface 146 and levitate an object positioned in opposing relation to the radiation surface 146. On the other hand, transducer 122 receives acoustic wave from the vibrating radiation surface 146 through the horn 126 and sound propagation tube 130. In this case, horn 126 collates the acoustic wave adjacent to the horn 126 for transmission to the transducer 122. Where transducer 120 acts as a transmitter and transducer 122 acts as a receiver, a traveling wave is created along the heater plate 106 which is useful in transporting the object 115 in the near-field region of the heater plate 106 along the heater plate 106, as described, for example, in U.S. Pat. No. 6,802,220 to Takasan et al., the content of which is incorporated herein by reference, and Sadayuki Ueha et al., "Non-contact transportation using near-field acoustic levitation," Ultrasonics 38 (2000)26-32, the content of which is incorporated herein by reference.

Figure 2B:
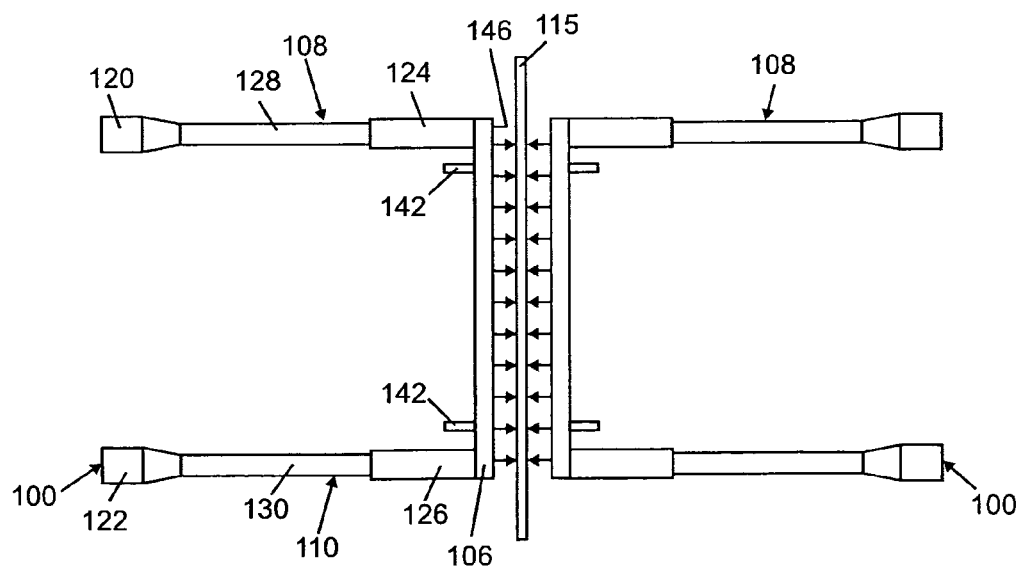
FIG. 2B depicts an object suspended between a pair of the heater apparatus of FIG. 2A.

In operation, the transducers (112 in FIG. 1B; 120, 122 in FIG. 2B) are energized, for example, by supplying them with electrical current. When the transducers are energized, acoustic waves are transmitted to the heater plates (104 in FIG. 1B; 106 in FIG. 2B) through the associated sound propagation tubes (116 in FIG. 1B; 128, 130 in FIG. 2B) and horns (114 in FIG. 1B; 108, 110 in FIG. 2B. The radiation surfaces (144 in FIG. 1B; 146 in FIG. 2B) vibrate in response to the acoustic waves received at the heater plates. The acoustic waves may have an operating frequency in a range from about 15 to 100 kHz or in the ultrasonic range. Where the object 115 is positioned in the near-field region of the acoustic wave radiation surfaces (144 in FIG. 1B; 146 in FIG. 2B), the object 115 is levitated. The near-field region is preferably within 750 μm, more preferably within 600 μm, of the acoustic wave radiation surfaces (144 in FIG. 1; 146 in FIG. 2). It is possible that the object can be levitated if positioned outside of this near-field region. However, if the object is too far from the radiation surfaces, the levitation force may be too weak to be useful in levitating the object. Where the transducers are configured such that a traveling wave propagates along the heater plate as described above, the object is transported in addition to being levitated. The near-field levitation force may be up to 10 kgf with a 10 cm×10 cm object.

Figure 3:
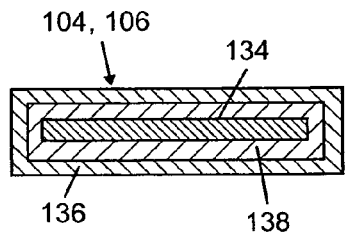
FIG. 3 is a cross-section of the heater plate of FIG. 1A or 2A, taken along line 3-3.

The heater plates (104 in FIG. 1A; 106 in FIG. 2A) are equipped to provide heat to the levitated object. In one example, as illustrated in FIG. 3, heater plate 104, 106 may include a heating element 134, such as a resistive element, inserted in a metal sheath 136, but separated from the metal sheath 136 by an insulating material 138. The resistive element 134 may be made of materials such as nickel chrome, inconel, platinum, and ceramic. The metal sheath 136 may be made of materials such as aluminum, stainless steel, titanium, inconel, and platinum. The insulating material 138 may be made of materials such as magnesium oxide and mica. The metal sheath 136 may be surface-treated to increase heat transfer by radiation and retard oxidation. The operating temperature of the heater plates (104 in FIG. 1A, 106 in FIG. 2A) may be from room temperature to about 1000° C. In the example shown in FIG. 1A, power may be supplied to the heating element in the heater plate 104 through electrical input terminals 140 on the back surface 118 of the heater plate 104. In the example shown in FIG. 2A, power may be supplied to the heating element in the heater plate 106 through electrical input terminals 142 on the back surface 132 of the heater plate 106. The electrical input terminals may be in the form of metallic posts, such as stainless steel posts. Although not shown in FIGS. 1A and 2A, a temperature monitoring sensor may be mounted on the heater plates (104 in FIG. 1A; 106 in FIG. 2A) for monitoring temperature output of the heater plates.

Figure 4:
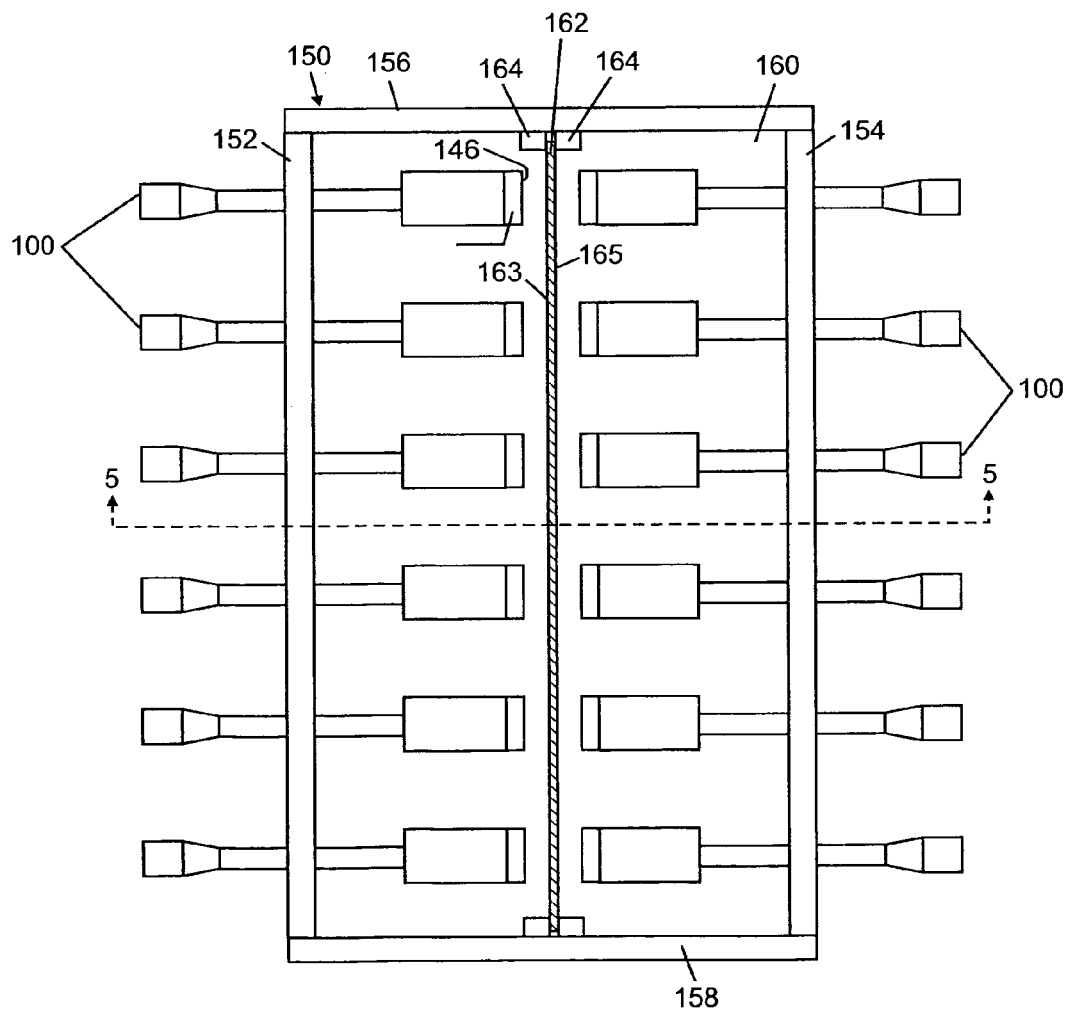
FIG. 4 is a top view of a system for stabilizing a sheet material incorporating a plurality of the heater apparatus of FIG. 2A.

FIG. 4 shows a top view of a system 150 for stabilizing a sheet material 162. The system 150 may be used as a fusion draw machine or used together with other systems requiring stabilization of a sheet material. The system 150 includes side walls 152, 154, 156, 158. The side walls 152, 154, 156, 158 may be made of furnace wall or heat-resistant material. A channel 160 for receiving the sheet material 162 is defined between the opposing side walls 152, 154. The sheet material 162 may be, for example, sheet glass descending from a weir device (not shown) and having pristine surfaces 163, 165. The edges of the sheet material 162 may pass between edge-guide devices 164, such as paired rollers, arranged along the length of the side walls 156, 158. A plurality of heater apparatus 100 are mounted in side walls 152, 154 with the associated heater plates 106 arranged at opposite sides of the channel 160. The radiation surfaces 146 of the heater plates 106 are in opposing relation to the surfaces 163, 165 of the sheet material 162. As will be explained later, the gap between the radiation surfaces 146 and the surfaces 163, 165 can be adjusted as necessary to control pressure and temperature distribution at the surfaces 163, 165 of the sheet material 162. In the system of FIG. 4, each of the heater apparatus 100 has two vibration sources, as described with respect to FIG. 2A. However, it is possible to use the heater apparatus 100 having a single vibration source, as described with respect to FIG. 1A, or heater apparatus 100 having more than two vibration sources.

Figure 5:
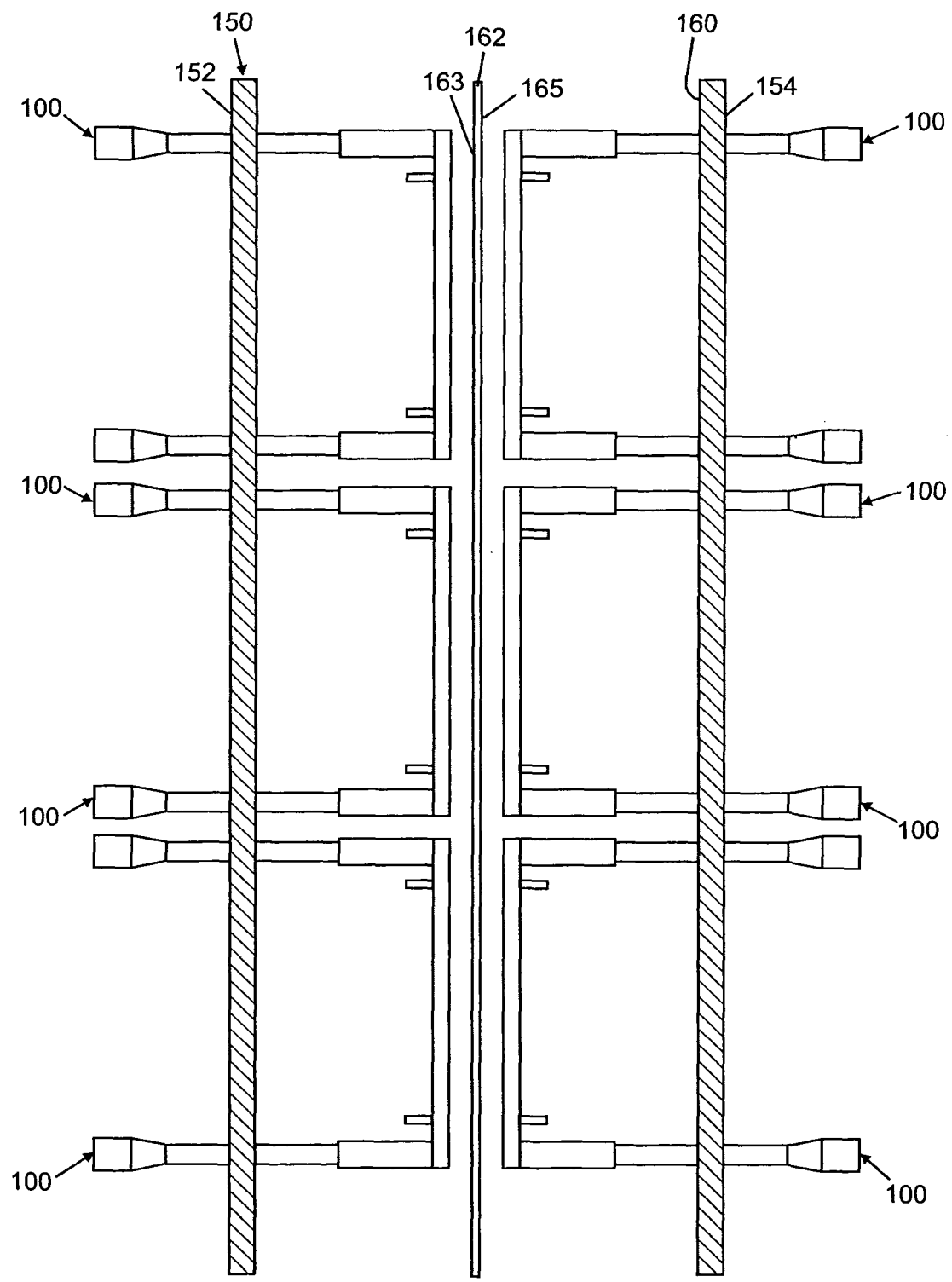
FIG. 5 is a vertical cross-section of the system of FIG. 4, taken along line 5-5.
Figure 6:
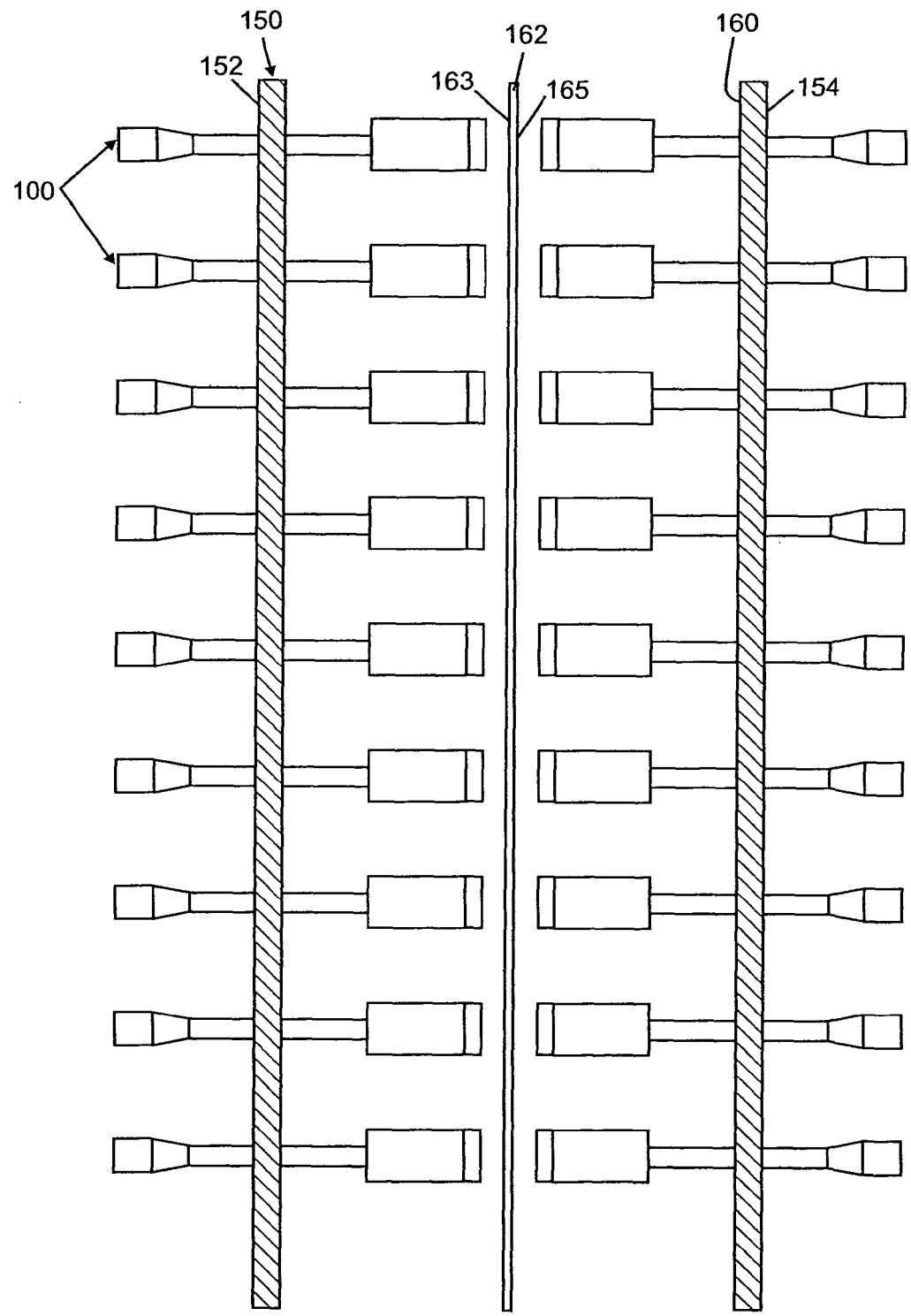
FIG. 6 is a vertical cross-section of a system for stabilizing a sheet material incorporating a horizontal arrangement of a plurality of the heater apparatus of FIG. 2A.
Figure 7:
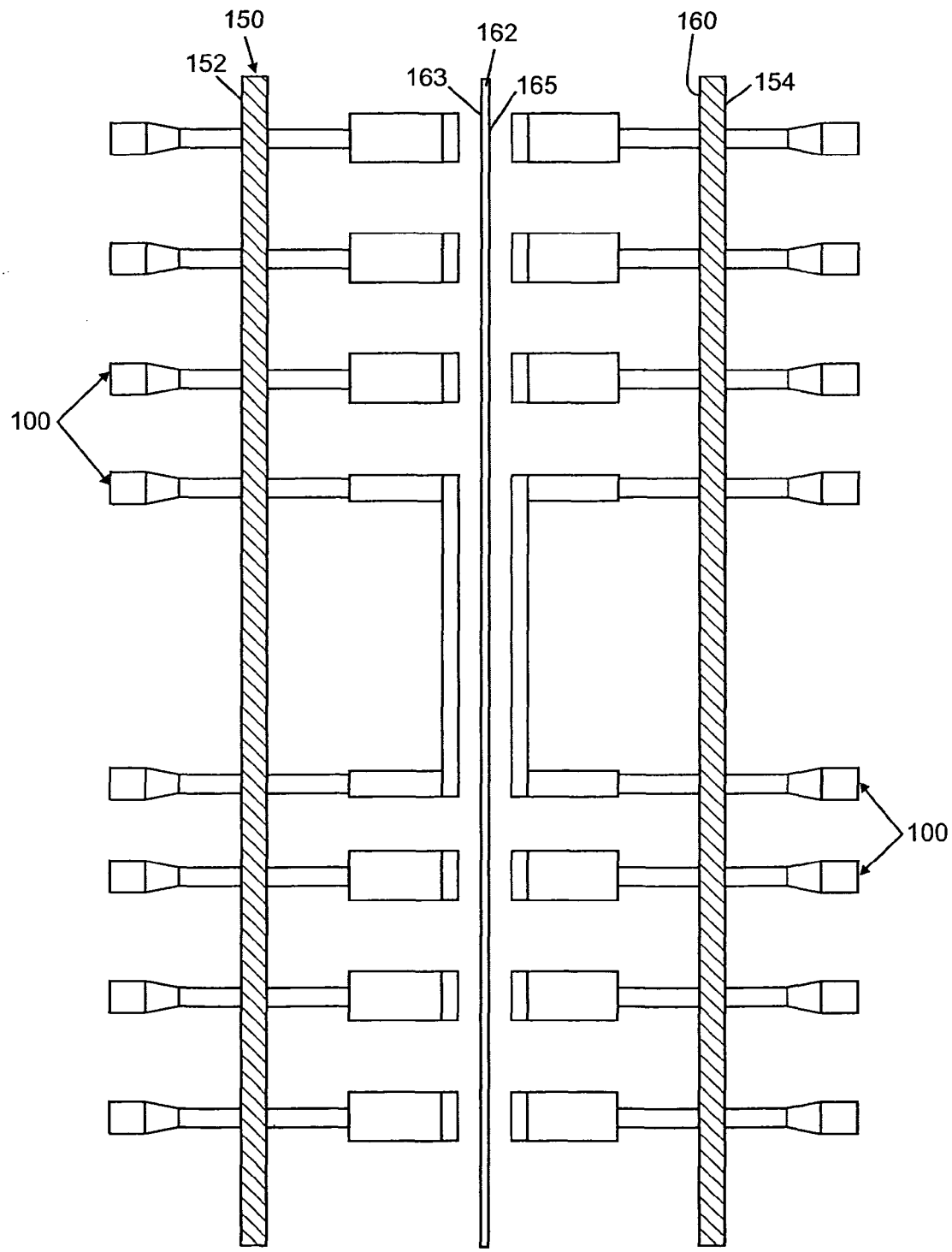
FIG. 7 is a vertical cross-section of a system for stabilizing a sheet of material incorporating horizontal and vertical arrangements of a plurality of the heater apparatus of FIG. 2A.
Figure 8A:
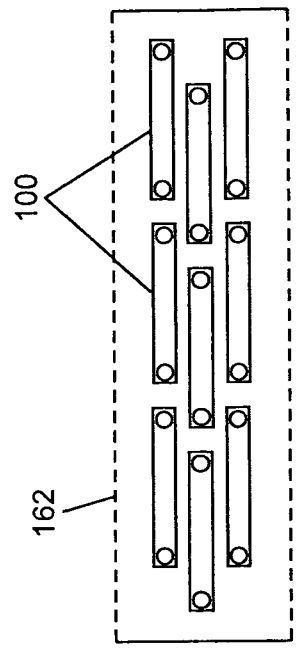
FIGS. 8A-8D are examples of arrangements of the heater apparatus of FIG. 2A across a width of a sheet material.
Figure 8B:
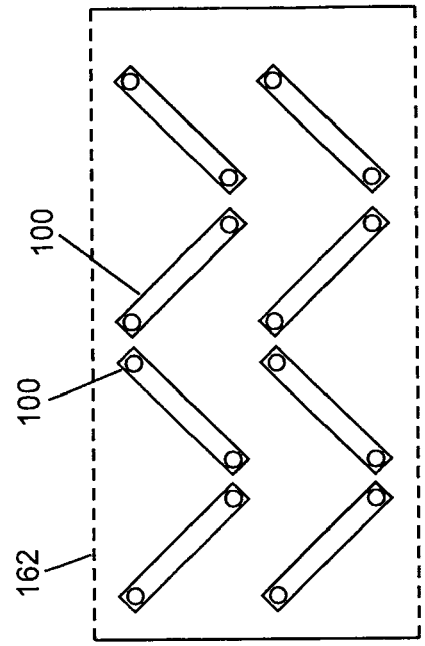
Figure 8C:
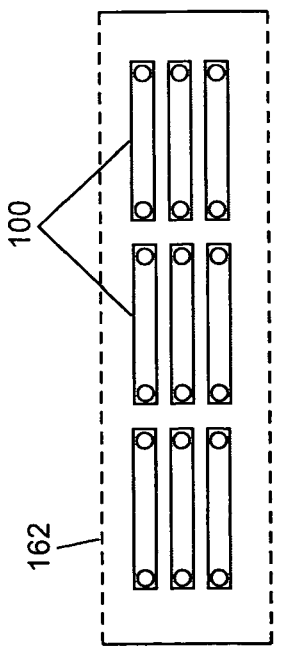
Figure 8D:
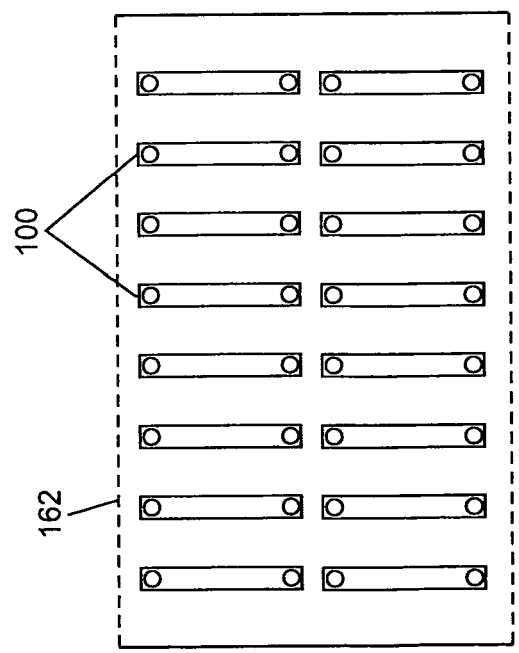

FIG. 5 shows a cross-section of the system 150. In this example, the side walls 152, 154 are vertical. The heater apparatus 100 are arranged in a vertical orientation within the channel 160 and are in opposing relation to the surfaces 163, 165 of the sheet material 162, as previously mentioned. In another example, as shown in FIG. 6, the heater apparatus 100 may be arranged in a horizontal orientation within the channel 160. In yet another example, as shown in FIG. 7, some of the heater apparatus 100 may be arranged in a vertical orientation while others are arranged in a horizontal orientation within the channel 160. FIGS. 8A-8D show various arrangements of the heater apparatus 100 relative to a surface of the sheet material 162. In FIG. 8A, the heater apparatus 100 are arranged horizontally across the width of the sheet material 162. In FIG. 8B, the heater apparatus 100 are staggered horizontally across the width of the sheet material 162. In FIG. 8C, the heater apparatus 100 are arranged vertically across the width of the sheet material 162. In FIG. 8D, the heater apparatus 100 are tilted across the width of the sheet material 162. Any suitable combination of heater apparatus 100 orientations relative to both surfaces of the sheet material 162 can be used to achieve a desired pressure and temperature distribution across the width and thickness of the sheet material 162.

Figure 9:
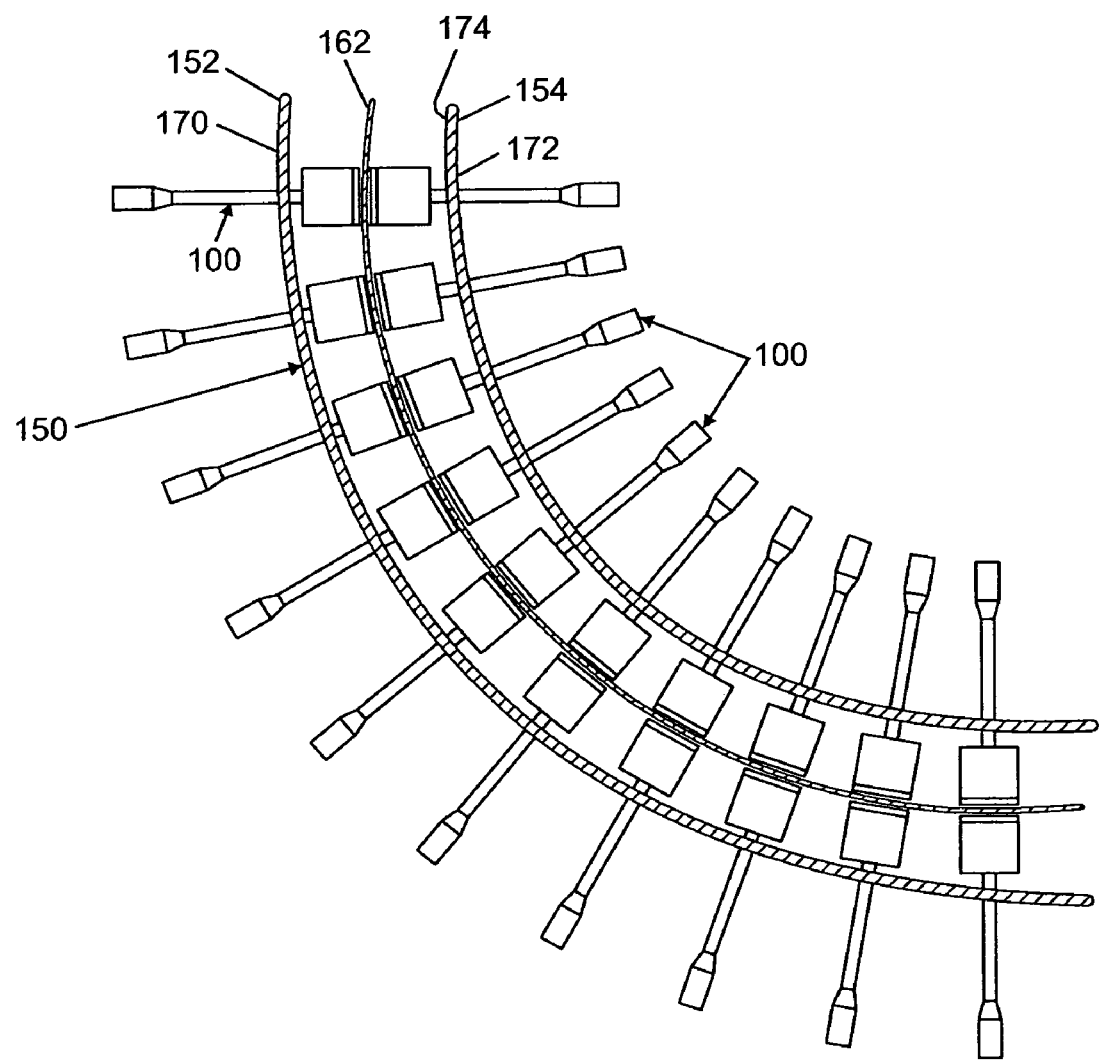
FIG. 9 is a vertical cross-section of a system for stabilizing a sheet material having curvilinear side walls and incorporating a plurality of the heater apparatus of FIG. 2A.
Figure 10:
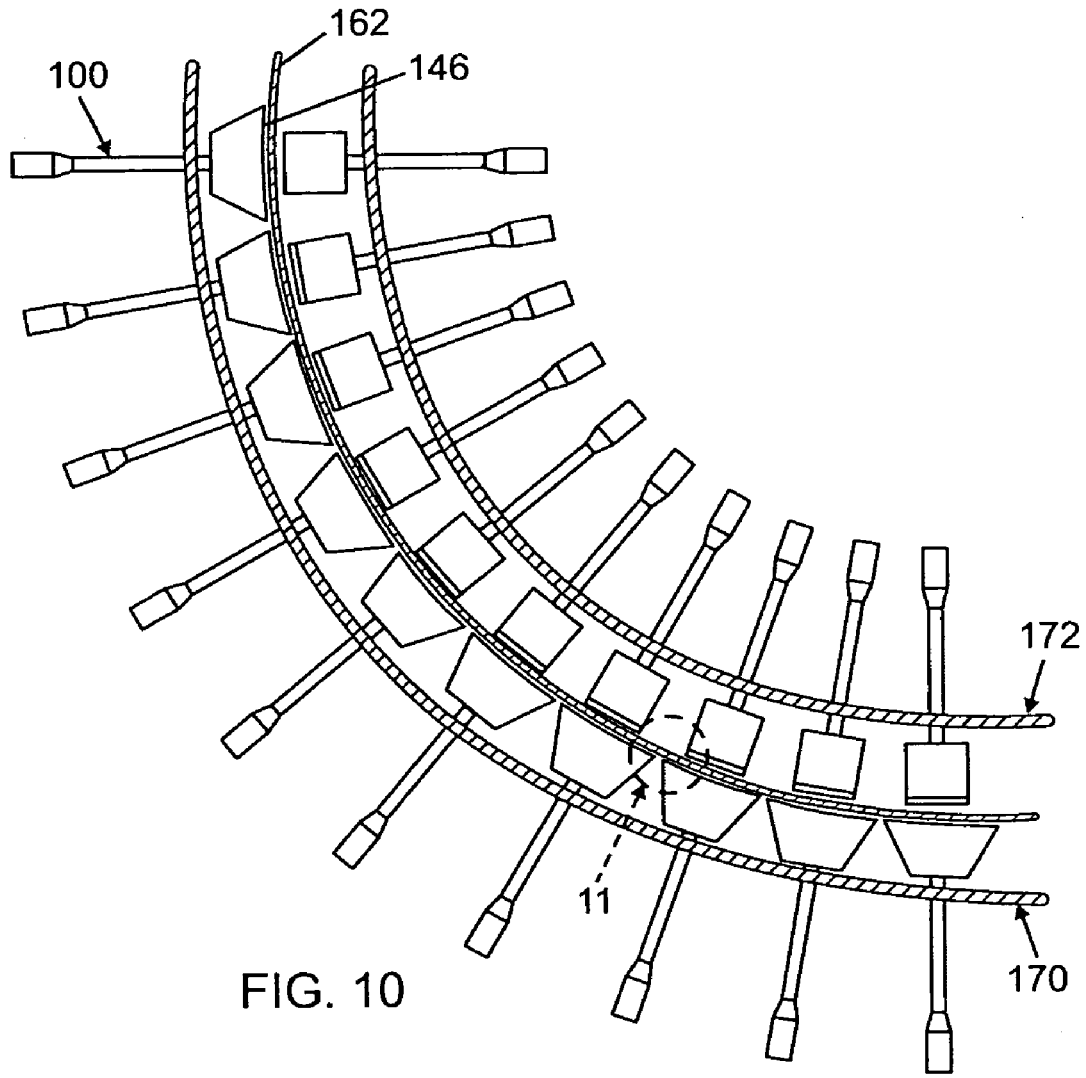
FIG. 10 is a vertical cross-section of a system of FIG. 9 incorporating a plurality of the apparatus of FIG. 2A modified with curvilinear radiation surfaces.
Figure 11:
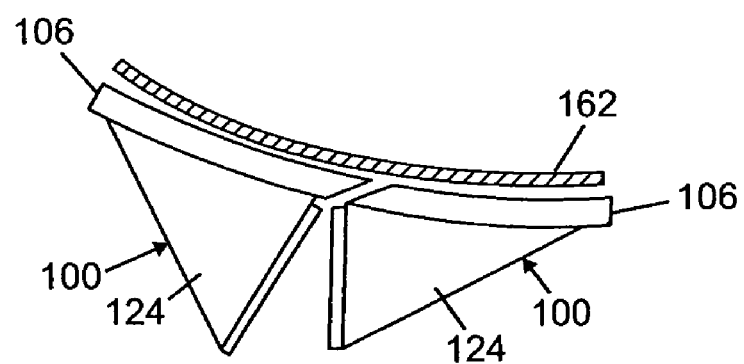
FIG. 11 is an enlargement of a portion of the system of FIG. 10.

FIG. 9 shows that the side walls 152, 154 may include first-order curvilinear portions 170, 172, respectively, resulting in first-order curvilinear channel 174 for receiving the sheet material 162. In the first-order curvilinear channel 174, the sheet material 162 assumes a first-order curvilinear profile. Heater apparatus 100 in this portion of the system 150 are arranged in a first-order curvilinear profile along the length of the sheet material 162. Across the width of the sheet material 162, any heater apparatus arrangement, such as illustrated in FIGS. 8A-8D, may be used. As illustrated in FIG. 10, the radiation surface 146 of some or all of the apparatus 100 may be curved (or have a curvilinear shape) to allow better conformance to the curvilinear profile of the sheet material 162. The heater apparatus 100 may be arranged very close together along the length of the sheet material 162. However, it is preferable that there is a separation between adjacent heater apparatus 100, as shown in FIG. 11.

Figure 12:
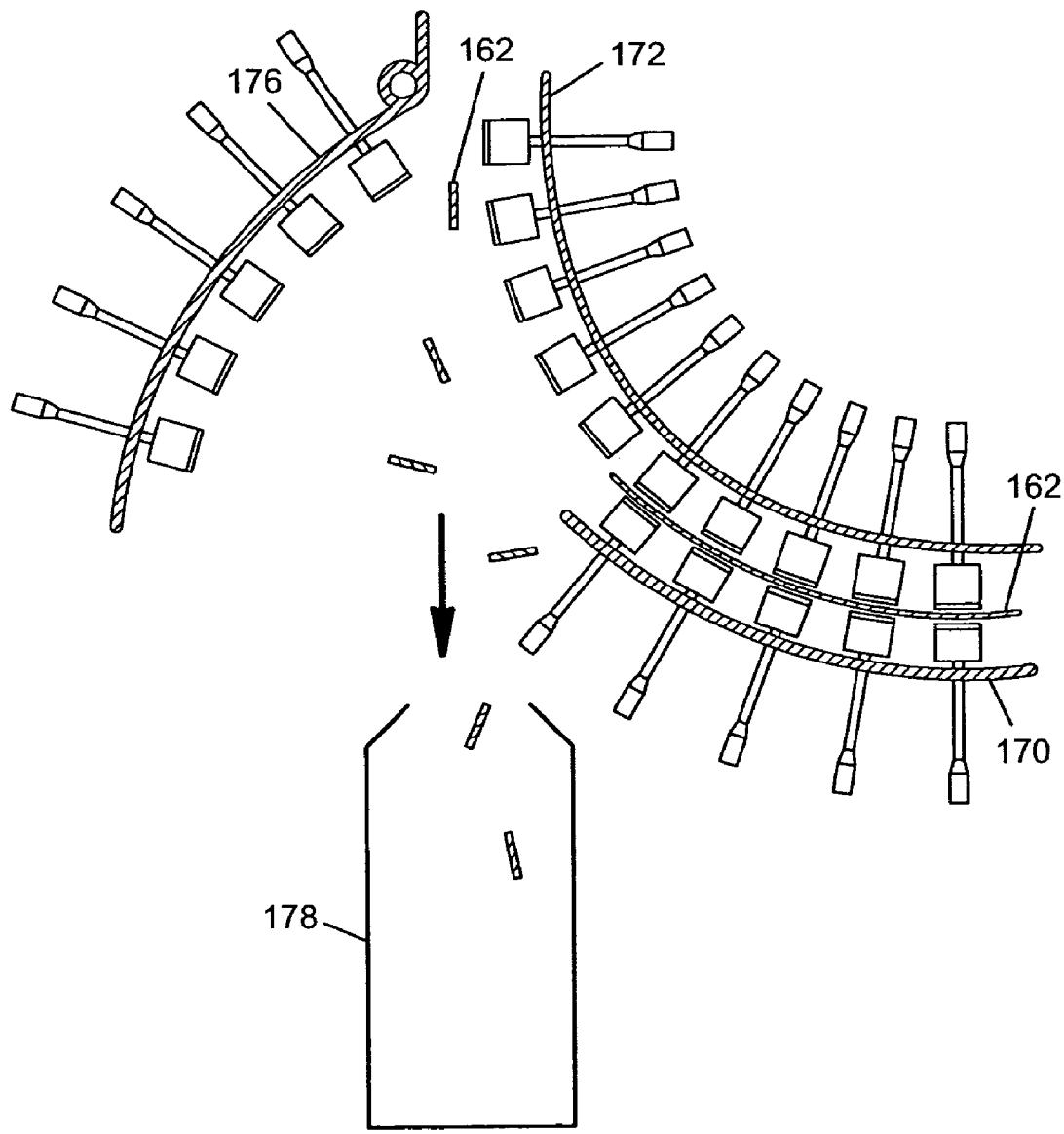
FIG. 12 depicts the system of FIG. 9 with a curvilinear side wall having a hinged portion.

Returning to FIG. 9, there are various advantages to including the curvilinear portions 170, 172 in the side walls 152, 154 in a fusion draw process. With a system 150 having only vertical side walls, there will be height constraints which may make it difficult to accomplish inline annealing. In a system with only vertical side walls, the sheet material may have to be cooled very quickly, which may induce higher stress within the material and result in higher compaction and distortion of the sheet material. The curvilinear portions 170, 172 make it possible to extend the side walls horizontally and incorporate inline annealing in the fusion draw process. A first-order curvilinear arrangement may also help prevent sheet disturbances created at the bottom of the draw by separation processes from propagating into an upper portion of the draw. A first-order curvilinear arrangement can also help reduce chimney effect and improve temperature stability in the upper portion of the draw and reduce glass surface contamination. FIG. 12 shows that a hinged section 176 may be provided in the side wall 170. In the event of a process upset, the hinged section 176 may be opened to allow debris created by the upset to fall into a recycle container 178 below the side wall 170.

Figure 13:
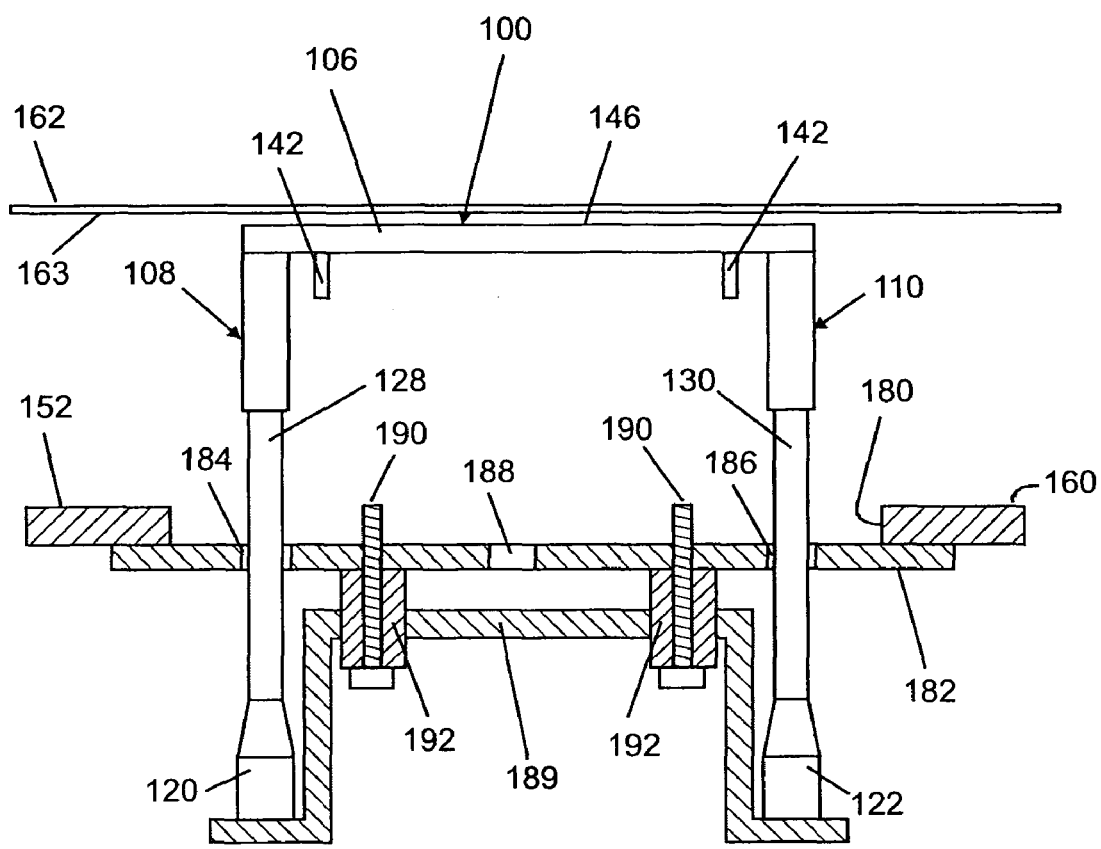
FIG. 13 illustrates a mechanism for adjustably mounting the heater apparatus of FIG. 2A in a wall of a system for stabilizing a sheet material.

Referring for example to FIG. 4, each heater apparatus 100 is mounted in one of the side walls 152, 154 such that its position is adjustable relative to a surface 163, 165 of the sheet material 162 (or relative to opposite sides of channel 160). This positioning can be achieved in a variety of ways. In one example, as illustrated in FIG. 13, an opening 180 is provided in the wall 152, and a guide plate 182 is mounted at the opening 180. The guide plate 182 has openings 184, 186 for receiving sound propagation tubes 128, 130 of vibration sources 108, 110. The guide plate 182 also includes an opening 188 through which wires can be connected to the electrical terminals 142. A base plate 189 is attached to the backside of transducers 120, 122. The base plate 188 is coupled to the guide plate 182 by screws 190, which are received in openings in spacers 192. Spacers 192 are mounted in openings in the base plate 189 and extend to the guide plate 182. Spacers 192 may be suitable adjusted relative to the base plate 189 to control the spacing between the plates 182, 189. In one example, spacers 192 include on their outer surfaces threads which allow them to be adjusted relative to the base plate by rotating them. After adjusting the position of the spacers 192, the screws 190 are tightened, thereby maintaining the desired spacing between the plates 182, 189.

In the arrangement shown, the spacing between the radiation surface 146 of the heater plate 106 and the opposing surface 163 of the sheet material 162 decreases as the spacing between the plates 182, 189 increases and vice versa. Thus, heater apparatus 100 can be retracted or extended relative to the surface 163 of the sheet material 162 by suitably adjusting the spacers 192. Other mechanisms for retracting and extending apparatus 100 relative to a surface of the sheet material 162 may be used. For example, instead of using screws 190 to adjust the position of the apparatus 100, linear actuators may be used. The linear actuators may be attached to the base plate 189 and positioned in between the plates 182, 189. Adoption of linear actuator(s) on the base plate may result in additional physical space surrounding the shaft area of the linear actuator, and this physical gap would lead to internal air leakage. In this case, the actuation cylinder or system may be covered with high temperature bellows to reduce the risk of air leakage from inside the sheet handling apparatus and also protect the actuation system from the heat in the sheet handling apparatus.

Heater apparatus 100 may be used to stabilize a sheet material while the sheet material is being handled in a fusion draw machine or other system, such as an annealing system, inspection system, or a sheet handling system in general. Heater apparatus 100 can, by stabilizing the sheet material, minimize stress and stress variation with the sheet material. Heater apparatus 100 may be placed within the fusion draw machine and used for stabilization and inline annealing of the sheet material. Heater apparatus 100 may be placed at the bottom (or an end) of the fusion draw machine. In this case, heater apparatus 100 may be effective in preventing sheet motion due to processes performed at the bottom of the fusion draw machine from propagating into the portion of the sheet material within the fusion draw machine. Because heater apparatus 100 can be positioned very close to the sheet material, it is possible to achieve fine control of temperature distribution in the sheet material, which would mean less stress and stress variation in the sheet material.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for stabilizing a sheet material, comprising:
a pair of opposing side walls defining a channel that receives the sheet material;
a plurality of heater apparatuses movably mounted in the side walls such that each of the heater apparatuses is selectively extendible or retractable through the side wall in which the heater apparatus is mounted in order to control a gap between the heater apparatus and an unconstrained portion of the sheet material in the channel, each of the heater apparatuses comprising a heater plate having a heating element and a radiation surface, the heater plate being configured to apply heat to the unconstrained portion, each of the heater apparatuses further comprising at least one vibration source having a first end coupled to the heater plate and a second end including a transducer, the at least one vibration source being configured to generate an acoustic wave and transmit the acoustic wave to the heater plate; and
at least one mechanism for selectively extending or retracting at least one of the heater apparatuses through the side wall in which the at least one of the heater apparatuses is mounted.

2. The system of claim 1, wherein two vibration sources are coupled to at least one of the heater plates and arranged to create a traveling wave along the at least one of the heater plates.

3. The system of claim 1, wherein at least one of the heater apparatuses is arranged in a first orientation relative to the channel and at least another one of the heater apparatus is arranged in a second orientation relative to the channel, the first orientation being different from the second orientation.

4. The system of claim 1, further comprising an additional pair of opposing side walls along which edge guide devices are arranged such that edges of the sheet material pass between the edge guide devices.

5. The system of claim 1, wherein the side walls each include a curvilinear portion.

6. The system of claim 5, wherein the curvilinear portion of at least one of the side walls includes a hinged section that can be opened to remove debris from the channel.

7. The system of claim 1, wherein the side walls are members of a fusion draw machine.

8. The system of claim 1, wherein the at least one vibration source has a sound propagation axis which that is substantially perpendicular to the heater plate.

9. The system of claim 1, wherein the radiation surface is planar.

10. The system of claim 1, wherein the radiation surface is curvilinear.

11. The system of claim 1, wherein the heater plate has an elongated shape.

12. The system of claim 1, wherein the first end of the at least one vibration source includes a horn configured to spread the acoustic wave generated by the transducer over the heater plate, and wherein the at least one vibration source further includes a sound propagation tube coupling the horn to the transducer.

13. The system of claim 12, wherein the horn has a truncated cone shape, and wherein a base end of the horn is coupled to the heater plate and a truncated end of the horn is coupled to the sound propagation tube.

14. The system of claim 1, wherein the heater plate has a disc shape.

* * * * *